(12) United States Patent
Borden

(10) Patent No.: US 10,154,526 B2
(45) Date of Patent: Dec. 11, 2018

(54) NETWORK SETUP FOR LIMITED USER INTERFACE DEVICES

(71) Applicant: GTHRIVE, INC., Santa Clara, CA (US)

(72) Inventor: Bruce S. Borden, Los Altos, CA (US)

(73) Assignee: GTHRIVE, INC., Santa Clara, CA (US)

( * ) Notice: Subject to any disclaimer, the term of this patent is extended or adjusted under 35 U.S.C. 154(b) by 0 days.

(21) Appl. No.: 14/774,498

(22) PCT Filed: Feb. 25, 2014

(86) PCT No.: PCT/US2014/018427
§ 371 (c)(1),
(2) Date: Sep. 10, 2015

(87) PCT Pub. No.: WO2014/163877
PCT Pub. Date: Oct. 9, 2014

(65) Prior Publication Data
US 2016/0037564 A1    Feb. 4, 2016

Related U.S. Application Data

(60) Provisional application No. 61/778,010, filed on Mar. 12, 2013.

(51) Int. Cl.
*H04W 12/06* (2009.01)
*H04W 76/10* (2018.01)
(Continued)

(52) U.S. Cl.
CPC ............. *H04W 76/10* (2018.02); *H04W 4/80* (2018.02); *H04W 12/04* (2013.01); *H04W 12/06* (2013.01);
(Continued)

(58) Field of Classification Search
None
See application file for complete search history.

(56) References Cited

U.S. PATENT DOCUMENTS

| 7,577,910 B1 | 8/2009 | Husemann et al. |
| 7,657,255 B2 * | 2/2010 | Abel .................... H04B 5/0031 455/414.1 |

(Continued)

FOREIGN PATENT DOCUMENTS

DE    102006040313 B3    2/2008

OTHER PUBLICATIONS

SimpleLink™ Product Family, SimpleLink Makes Wireless Design Easier, Copyright 1995-2013 Texas Instruments Incorporated, downloaded from the Internet on Mar. 13, 2013 at: http://www.ti.com/ww/en/simplelink/, 2 pages.

(Continued)

*Primary Examiner* — Kouroush Mohebbi
(74) *Attorney, Agent, or Firm* — Nicholson De Vos Webster & Elliott LLP

(57) ABSTRACT

Exemplary methods, apparatuses, and systems establish a wireless connection between a full-feature device and a limited user interface (UI) device to enable the full-feature device to transmit, and the limited UI device to receive, network setup information for the limited UI device to utilize in connecting to a wireless access point. For example, the transmission and receipt of network setup information include establishing a secure connection between the limited UI device and the full-feature device to configure the limited UI device as a wireless local area network client using the display and input capabilities of the separate full-feature device.

16 Claims, 3 Drawing Sheets

(51) Int. Cl.
*H04W 4/80* (2018.01)
*H04W 12/08* (2009.01)
*H04W 12/04* (2009.01)
*H04W 48/16* (2009.01)
*H04W 88/08* (2009.01)

(52) U.S. Cl.
CPC ........... *H04W 12/08* (2013.01); *H04W 48/16* (2013.01); *H04W 88/08* (2013.01)

(56) References Cited

U.S. PATENT DOCUMENTS

| | | | |
|---|---|---|---|
| 8,458,363 | B2 | 6/2013 | Rosenblatt et al. |
| 2005/0192013 | A1 | 9/2005 | Perrot et al. |
| 2006/0221919 | A1 | 10/2006 | McRae et al. |
| 2007/0054616 | A1 | 3/2007 | Culbert |
| 2007/0171992 | A1 | 7/2007 | Shameli et al. |
| 2007/0260711 | A1 | 11/2007 | Gupta et al. |
| 2008/0008125 | A1 | 1/2008 | Pham et al. |
| 2008/0253339 | A1 | 10/2008 | Libault et al. |
| 2009/0177820 | A1 | 7/2009 | Ranade et al. |
| 2009/0271709 | A1 | 10/2009 | Jin et al. |
| 2010/0124881 | A1 | 5/2010 | Uppunda et al. |
| 2011/0205971 | A1 | 8/2011 | Ito et al. |
| 2011/0277023 | A1 | 11/2011 | Meylemans et al. |
| 2012/0257543 | A1 | 10/2012 | Baum et al. |
| 2012/0322368 | A1 | 12/2012 | Desai et al. |
| 2013/0053014 | A1 | 2/2013 | Sung |
| 2013/0170392 | A1* | 7/2013 | Wyler .................. H04W 4/001 370/254 |

OTHER PUBLICATIONS

PCT Search Report and Written Opinion for PCT/US2014/018427, dated Jun. 17, 2014, 10 pages.
Extended European Search Report for Application No. 14778092.8, dated Oct. 10, 2016, 7 pages.
International Preliminary Report on Patentability for International Application No. PCT/US2014/018427, dated Sep. 15, 2015, 6 pages.
First Mexican Office Action, Application No. MX/a/2015/012926, dated Aug. 18, 2016, 8 pages.
Second Mexican Office Action, Application No. MX/a/2015/012926, dated Feb. 13, 2017, 10 pages.
First Australian Examination Report, Application No. 2014249935, dated Mar. 9, 2017, 3 pages.
Office Action from foreign counterpart Israeli Patent Application No. 241385, dated Aug. 15, 2018, 6 pages.

* cited by examiner

NETWORK SETUP FOR LIMITED USER INTERFACE DEVICES

CROSS-REFERENCE TO RELATED APPLICATIONS

This application is a National stage of International Application No. PCT/US2014/18427, filed Feb. 25, 2014, which claims the benefit of U.S. Provisional Application No. 61/778,010, filed Mar. 12, 2013, which is hereby incorporated by reference.

FIELD

The various embodiments described herein relate to setting up a wireless network. In particular, embodiments relate to enabling a wireless client device (e.g., a Wi-Fi station) with a limited user interface to be configured to connect to a wireless network (e.g., connected to a Wi-Fi access point) by an independent full-feature device.

BACKGROUND

A wireless access point (AP or WAP) connects one or more wireless client devices to a local area network (LAN) or another network. A Wi-Fi client device (e.g., as defined by IEEE 802.11) goes through a setup process to associate/connect with a Wi-Fi AP. This setup process typically utilizes an input and display interface typical of a full-feature client device. For example, the setup process typically includes the client device scanning for AP's within range, displaying AP's found within range of the client device, receiving user selection of a displayed AP, receiving/transmitting a network key or password (if required by the AP) entered by the user via an input interface, and establishing a connection to the AP. If the network key is incorrect, an error message is displayed to the user. As used herein, a full-feature device refers to a device including an input interface and a display interface, which facilitate at least a portion of the above-described setup process. Exemplary full-feature devices include personal computers, smartphones, and tablets.

In contrast, a limited user interface (UI) device lacks one or both of the input interface and display interface. Due to the lack of the display and input interface components to perform network setup described above, limited UI devices cannot easily connect to an AP because no mechanism exists to display setup information to and receive setup information from a user (such as displaying AP names and a prompt for a security key and receiving selection of an AP name and entry of a security key). Current attempts to simplify Wi-Fi setup, such as Wi-Fi Protected Setup (WPS), either require knowing and entering a PIN, or pressing buttons on the client device and access point at the same time, or both, while other attempts send information to the client device without encryption, exposing the Wi-Fi network to snooping devices.

Additionally, AP's may also be set up with their AP name/identifier (also referred to as the Basic Service Set ID—BSSID or SSID) to be hidden. When a client device scans for a list of available AP's, that list will not include the hidden AP name. If an AP name cannot be discovered by a client device, it is harder for malicious clients to mount some security attacks. Additionally, as more and more devices are enabled to broadcast an AP name, the list of devices appearing within the results of a scan of nearby AP devices becomes longer. This, in turn, makes it more difficult for a user to find a given device name within a list of results from the AP scan. As a result, administrators may choose to have AP names be hidden to reduce "noise" in AP scan results. The use of a hidden AP name, however, includes receiving manual user input (e.g., via a virtual or physical keyboard) of the AP name rather than the selection of a displayed discovered AP name.

SUMMARY OF THE INVENTION

Exemplary methods, apparatuses, and systems shift the network setup functionality of the user interface from the limited UI device to a full-feature device. In one embodiment, the limited UI device has a reset capability to enter network setup mode. Alternatively, the limited UI device may be in network setup mode whenever it is not connected to an AP. In one embodiment, a smartphone acts as the full-feature device to configure the limited UI device.

At first power up, when a reset button is pressed, or whenever the limited UI client device cannot connect to the network, the limited UI device enters a network setup mode that allows the full-feature device to connect to the limited UI device. For example, if the network is Wi-Fi, the limited UI device becomes an access point for the full-feature device or the limited UI device goes into Ad-Hoc mode. In either case, the limited UI device will have a name/SSID that allows another Wi-Fi device to connect to it. In one embodiment, the limited UI device has a barcode (such as a Universal Product Code barcode or QR code), which is read by the full-feature device to uniquely identify the limited UI device and establish a secure connection during setup. Alternatively, a near-field communication (NFC) or Radio Frequency ID (RFID) tag in the limited UI device is used for identification and establishing a secure communication. In one embodiment, the limited UI device utilizes an encryption key to secure the network setup (e.g., the full-feature device scans or reads the encryption key from the limited UI device barcode or NFC tag). Once connected with the limited UI device, the full-feature device completes the setup process by providing setup information to enable the limited UI device to connect to an AP. Once setup, the limited UI device will connect to the AP and store the setup information in static memory. The limited UI device may continue to use the setup information through power cycles until directed to remove the setup information or to use new information through the setup reset button or other reset capability.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments described herein provide a simplified wireless setup technique enabling a device with little or no user interface components to be configured to connect to a network access point through the use of an interface of a full-feature device. The described wireless setup embodiments enable wireless networking for a broad set of devices that were heretofore unable to be networked, connected to a network in an insecure manner, or were burdened with additional hardware/software that increased cost.

Figure 1:
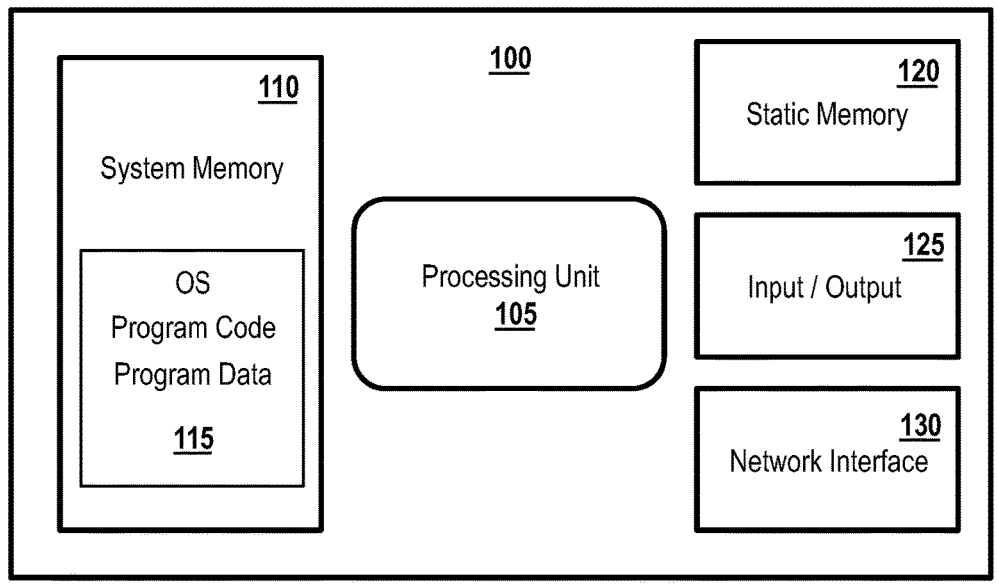
FIG. 1 illustrates, in block diagram form, an exemplary full-feature device including display and input components to implement the network setup for a limited UI device.

FIG. 1 illustrates, in block diagram form, a full-feature device 100, including a processor 105, system memory 110, some form of non-volatile or static memory 120, input/output (I/O) interfaces 125, and a network interface 130. Exemplary full-feature devices 100 include a personal computer, notebook, netbook, smartphone, tablet, etc. The system memory 110 and/or static memory 120 may include one or more of volatile and non-volatile memories, such as Random Access Memory (RAM), Read Only Memory (ROM), a solid state disk (SSD), Flash, Phase Change Memory (PCM), or other types of data storage. The memory 110/120 may be internal or distributed memory. The I/O interfaces 125 may include a display device, mouse, keypad or a keyboard, a touch panel or a multi-touch input panel, camera, optical scanner, a near field communication (NFC) device, controllers for such I/O devices, other known I/O devices, or a combination of such I/O devices. In one embodiment, the network interface 130 is a Wi-Fi transceiver. Alternatively, the network interface 130 is another wireless transceiver capable of connecting with a limited-UI device to securely transmit network setup information. It will be appreciated that one or more buses (not shown) may be used to interconnect the various components shown in FIG. 1.

Figure 3:
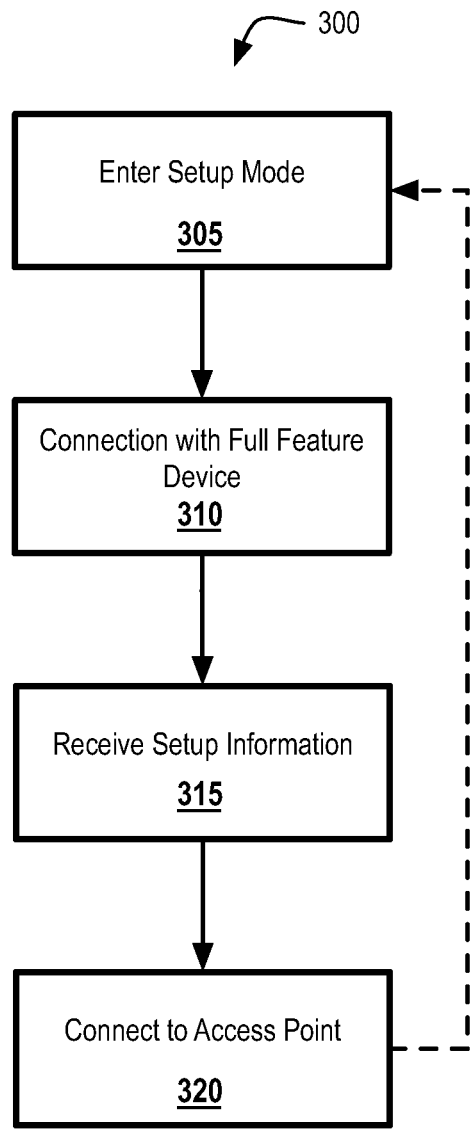
FIG. 3 is a flow diagram illustrating an exemplary method of a limited UI device setting up a network connection to an access point in cooperation with a full-feature device.
Figure 4:
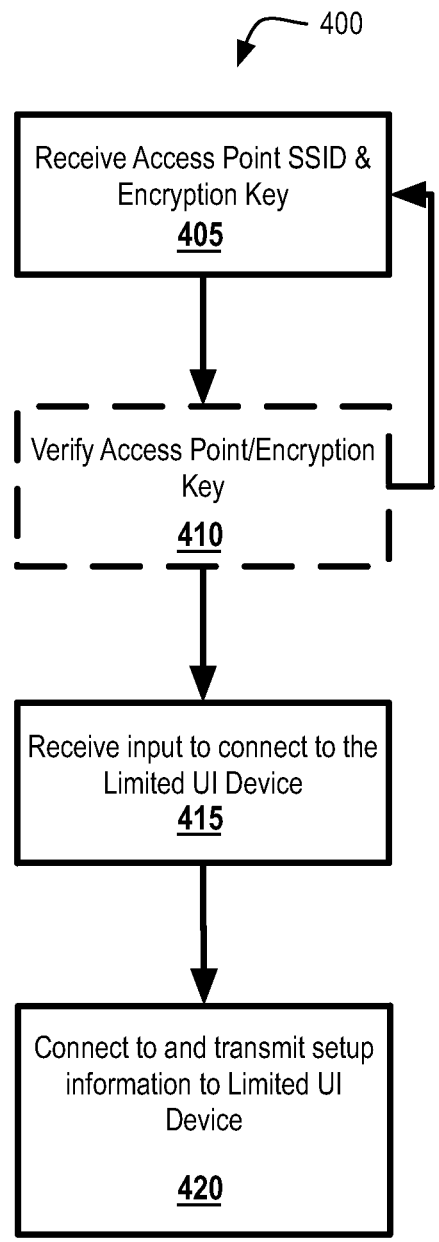
FIG. 4 is a flow diagram illustrating an exemplary method of a full-feature device setting up the limited UI device to enable the limited UI device to connect to the access point.

In one embodiment, the full-feature device 100 stores, e.g., in the system memory 110 or static memory 120, an operating system (OS), program data, and program code 115 to facilitate setting up a limited UI device to connect to a wireless local area network, as described herein with reference to FIGS. 3 and 4. For example, the full-feature device 100 enables user interactions, via I/O interfaces 125, including the selection of an access point from a displayed list or entering an AP name/SSID. If required by the access point, the user interaction further includes entering a security key to encrypt communication with the specified AP. The terms network key, security key, encryption key, and password are used interchangeably herein.

In one embodiment, the operating system 115 includes a wireless setup program. The wireless setup program, in cooperation with the network interface 130, finds APs within range of the full-feature device 100 and presents them as a list to a user. The user may select an AP (via mouse click, touch screen tap, arrow keys on a keyboard, etc.) and, in response to the received user selection, the setup program will prompt for a security key (if required by the selected AP). Alternatively, the user may enter the AP name/SSID of a hidden AP. The setup will be complete if the key is determined to be correct (e.g., by attempting to connect to the AP using the network interface 130), or no key is required, and the device will then be able to communicate on the wireless network. The AP name and security key are stored (e.g., in system memory 110 or static memory 120) for later use, so that the user does not need to re-enter them to connect to the same network again.

Figure 2:
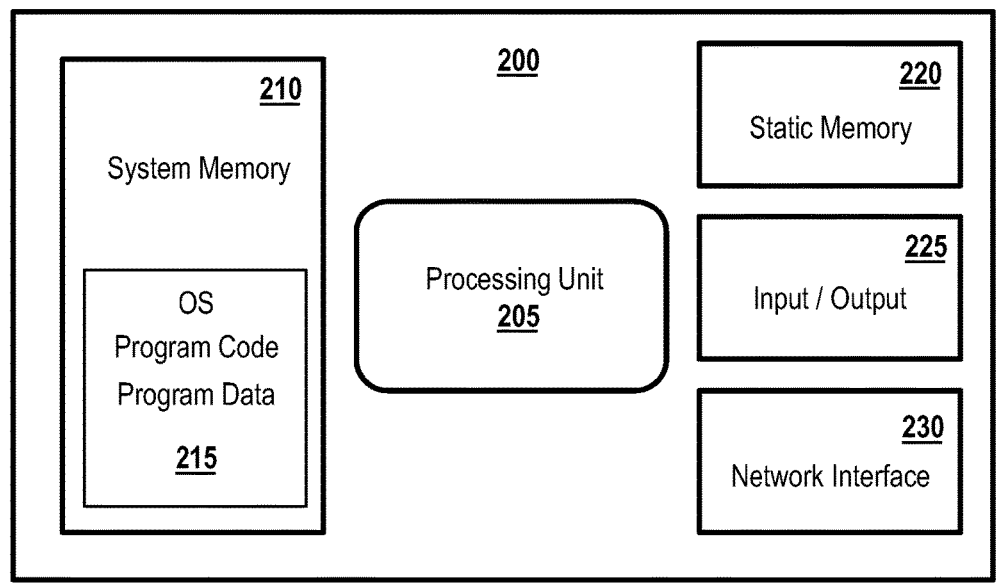
FIG. 2 illustrates, in block diagram form, an exemplary limited UI device to couple to a full-feature device for implementation of the network setup for the limited UI device.

FIG. 2 illustrates, in block diagram form, a limited UI device 200, including a processor 205, system memory 210, some form of non-volatile or static memory 220, input/output (I/O) interfaces 225, and a network interface 230. Many of these components may be similar to components of the same name and described with reference to the full-feature device 100, with the exception of I/O interfaces 225, which lack some or all of the user interface devices necessary to easily configure network setup, such a display, touchscreen, keyboard, buttons, etc. For example, the limited UI device 200 may lack both a display and an input device such as a keyboard, touch interface, or button. Alternatively, the limited UI device 200 may include a display and a simplistic input device, including one or more of a button, dial, arrow keypad, or receiver to receive similar simplistic input from a remote control. In such an embodiment, a user inputting network setup data moves a cursor to each character using the dial or arrow keypad and presses a button to select the character. Given the number of characters in a network identifier and/or network key, and when compared to using a full keyboard, inputting network setup data on such a limited UI device 200 results in a poor user experience.

The limited UI device 200 optionally includes some mechanism (e.g., a button, switch, accelerometer, etc.) to set the device into a network setup mode. Alternatively, the limited UI device 200 may enter the network setup mode in response to the limited UI device 200 not being connected to an AP, on initial power up of the limited UI device 200, or if the AP is not responding. In one embodiment, the I/O interfaces 225 include a light-emitting diode (LED) or other light to indicate a state of the limited UI device 200. In one embodiment, the I/O interfaces 225 include a NFC/RFID tag to communicate a SSID and/or encryption key for establishing a secure connection. In another embodiment, the limited UI device includes SSID and/or encryption key information in a barcode or other machine-readable or machine-scannable format (not shown). Exemplary limited UI devices 200 include a light switch, a household appliance (e.g., a refrigerator, a coffee machine, a clothes washer, etc.), a thermostat, a wireless network extender or uplink, a printer, a robot (e.g., a vacuum/floor cleaning robot), a security camera, a motion sensor, an electronic toy, a keyless entry door lock, etc.

FIG. 3 is a flow diagram illustrating an exemplary method 300 of a limited UI device 200 setting up a network connection to an AP in cooperation with a full-feature device 100. At block 305, the limited UI device 200 enters a network setup mode to enable a connection between the limited UI device 200 and the full-feature device 100. For example, the limited UI device 200 enters the network setup mode in response to determining that the limited UI device 200 lacks a network connection, determining that a current network connection has been lost or becomes unresponsive for a threshold period of time, following a power up of the limited UI device 200 (e.g., as a default, initial mode), or receiving input from a user (e.g., via a button/limited I/O interface 225, by way of an existing network connection, or as a result of near-field communication (NFC) with a full-feature device 100). For example, if the limited UI device 200 enters the setup mode after being programmed to connect to an AP and the AP can be reached again, or another AP with the same SSID and security keys is powered on within range, the limited UI device 200 will return to connected operation. If a limited UI device does not have a button or physical mechanism to enter network setup mode, or as an alternative to using a button or physical mechanism to enter network setup mode, powering off the associated AP, or sending the limited UI device a command through the associated network may be used to trigger the network setup mode. In an embodiment in which the limited UI device 200 powers down and up frequently, it may not be practical to reprogram the limited device 200 after every power failure/cycle, so the setup mode is triggered by an initial power up rather than by each power cycle. Further exemplary triggers for entering the network setup mode include an input from an accelerometer (e.g., as a result of shaking the device, turning the device over, etc.) and toggling a switch a predetermined number of times or in a particular pattern. In one embodiment, the limited UI device 200 alternates between attempting to connect to a preprogrammed AP for a threshold period of time and being in the network setup mode for a threshold period of time.

In one embodiment, an LED can be used to indicate the mode of the device—e.g., a network setup mode or a network connected mode. For example, a multi-color LED may be used such that a first color represents the network setup mode and a second color represents the limited UI device 200 being connected to a network.

In network setup mode, the SSID identifying the limited UI device 200 (so that the full-feature device 100 may connect to the limited UI device 200) may be common to a type of device (e.g., a device name, such as "Light-Switch" for a light switch), or unique to the specific device (such as its serial number), and the SSID may be visible in a network scan or hidden. Additionally, in the network setup mode, the limited UI device 200 operates as an AP or ad hoc (or other direct/peer-to-peer) device rather than a network/Wi-Fi client device to facilitate connection to and network programming from a full-feature device 100.

At block 310, while in network setup mode, the limited UI device 200 connects to a separate, full-feature device 100. For example, the full-feature device 100 connects to the limited UI device 200 as a client or ad hoc node using Wi-Fi. In one embodiment, the limited UI device 200 transmits a beacon including an SSID to enable the full-feature device 100 to discover the limited UI device 200. Alternatively, the limited UI device 200 utilizes a hidden SSID. The limited UI device 200 receives a request from the full-feature device 100 to connect to the limited UI device 200, e.g., one or more association and/or authentication transmissions (e.g., frames) from the full-feature device 100 including, e.g., an identification for the full-feature device 100 and, if required, a security key. In one embodiment, when establishing a secure connection between the limited UI device 200 and the full-feature device 100, the full-feature device 100 will scan a barcode or QR code on the limited UI device 200 (e.g., using a smartphone camera or other scanning device) or otherwise read an RFID or NFC tag on or inside the limited UI device 200 to obtain the SSID and/or encryption key the full-feature device 100 uses to connect to the limited UI device 100. The full-feature device 100 uses the encryption key in the authentication process of creating a secure connection with the limited UI device 200. For example, the full-feature device 100 may run the encryption key through a key derivation function or other security protocol or directly use the encryption key to encrypt data transmitted to the limited UI device 200. Similarly, using or otherwise based upon the encryption key, the limited UI device 200 authenticates the encrypted data received from full-feature device 100. The limited UI device 200 transmits a response to the full-feature device 100 to confirm or reject the full-feature device's 100 attempt to connect. The limited UI device 200 and the full-feature device 100 can use fixed internet protocol (IP) addresses, or the limited UI device 200 can act as a dynamic host configuration protocol (DHCP) server and provide an IP address to the full-feature device 100 in response to a DHCP request.

At block 315, once a connection is established between the limited UI device 200 and the full-feature device 100, the limited UI device 200 receives network setup information from the full-feature device 100. The limited UI device 200 may implement a web server to facilitate communicating with the full-feature device 100, e.g., according to a protocol from the Internet protocol suite. In one embodiment, communication between the limited UI device 200 and the full-feature device 100 is encrypted to prevent snooping.

The setup information received from the full-feature device 100 includes an SSID for an AP to which the limited UI device 200 will connect. In one embodiment, the setup information received from the full-feature device 100 also includes a security key to enable the limited UI device 200 to connect to a secured AP specified by the SSID. The setup information may be included within a single message, or within a series of messages. In one embodiment, a single encrypted message via transmission control protocol (TCP) is received, the message including a set of key:value pairs separated by newline characters. Keys include, for example, "SSID", "Security-Type", "Key", "IP", "URL", "UID", "Certificate", "Confirmation-IP", "Location", "ACK-Type", "ACK-Name", and "Notes". Information about the limited UI device 200, such as its global positioning system (GPS) location or human-readable location, description, etc., may also be sent from the full-feature device 100 to the limited UI device 200, or sent to a website associated with the limited UI device 200.

Once the communication of the setup information is received, at block 320, the limited UI device 200 sets its network settings to client mode and attempts to connect to the AP specified by the full-feature device 100 with, if provided, the security key specified by the full-feature device 100. If the limited UI device 200 successfully connects to the specified AP, the limited UI device 200 can operate on the network (e.g., sending and/or receiving data over the network). If the limited UI device 200 does not successfully connect to the specified AP, or if the limited UI device 200 is reset or otherwise returned to the network setup mode, the limited UI device returns to block 305.

In one embodiment, the limited UI device 200 communicates to the full-feature device 100 or otherwise to a user that the limited UI device 200 successfully connected to the specified AP. There are a variety of ways for the limited UI device 200 to communicate its successful network connection to the full-feature device 100 or user, including illuminating a LED, making a sound, directly connecting to the full-feature device 100 over the network, e.g., using an IP address sent to the limited UI device along with the setup information (using the "Confirmation-IP" above), via a technique such as Zero Configuration Networking (using the "ACK-Type" and "ACK-Name" above), or through a web site stored by the limited UI device 200 (e.g., a default/factory setting) or sent to the limited UI device 200 along with the setup information (using the "URL", "UID" and/or "Certificate" above). In an alternate embodiment, the full-feature device 100 attempts to connect to the limited UI device 200 after a defined delay. If the full-feature device 100 is able to connect (e.g., via the setup mode described above with reference to block 305) or otherwise indicates that it was unable to connect to the specified AP, it is determined that the setup failed and the method 300 may begin again.

In one embodiment, the limited UI device 200 saves the setup information in non-volatile memory 220 to use for future connections, such as after a power failure/power cycle. In response to a command received over the network or by a full-feature device 100 (e.g., as a part of receiving setup information in block 315), the limited UI device 200 may be returned to a default state or otherwise instructed to delete the saved setup information. Returning to the default state or deleting saved setup information prepares the limited UI device 200 for, e.g., to be sold or to connect to a new AP. In one embodiment, the limited UI device 200 saves setup information for and is able to access multiple AP's, e.g., each with their own SSID, security type, and/or security key. For example, the setup information received from the full-feature device 100 may include additional commands or key:value pairs for each additional AP. In an embodiment in which the limited UI device 200 receives setup information for multiple AP's, the limited UI device 200 attempts to connect to each AP in a sequence, e.g., in the order received or otherwise as designated by the full-feature device 200.

Enterprises regularly change their security keys to minimize the impact of a key getting cracked or otherwise discovered or determined. In one embodiment, a security key saved by the limited UI device 200 is changed/updated using the setup process described above with reference to method 300. Alternatively, another device, such as a networked device/server, changes the security key via a network connection with the limited UI device 200 (e.g., via the AP).

FIG. 4 is a flow diagram illustrating an exemplary method 400 of a full-feature device 100 communicating setup information to the limited UI device 200 to enable the limited UI device 200 to connect to an AP. At block 405, the full-feature device 100 receives network setup information, e.g., an AP SSID and encryption key. In one embodiment, the full-feature device 100 receives user selection of one or more AP's from a list of AP's detected within range of the full-feature device 100. Alternatively, the user enters an SSID for an AP, e.g., via a keyboard, touchscreen, voice, or other input device. In one embodiment, the full-feature device 100 queries the AP for an encryption requirement and the user is prompted to supply an encryption key if one is required. In one embodiment, the setup information is stored in non-volatile memory 120 of the full-feature device 100, or at a remote network location accessible to the full-feature device 100, so that the full-feature device 100 may use the SSID and encryption key again in the future without re-entry.

At block 410, the full-feature device 100 optionally connects to the specified AP to verify that the SSID and encryption key is correct. For example, when the limited UI device 200 and the full-feature device 100 are physically close, the AP being specified should be within range of both devices and the full-feature device 100 received the information needed to connect to the specified AP as described above with reference to block 405. This verification of the correct SSID and encryption key helps ensure that the limited UI device 200 will successfully connect to the AP.

In one embodiment, an AP restricts access by client device physical network address (e.g., media access control (MAC) address), name, or other client device characteristic, so the AP may be configured to accept connection from the full-feature device 100 while rejecting connection from the limited UI device 200, or vice versa. In such an embodiment, the full-feature device 100 may "spoof" the limited UI device 200, or vice versa. For example, the full-feature device 100 uses the limited UI device's client device characteristic to connect the AP to verify the SSID and encryption key.

In one embodiment, the full-feature device 100 is a smartphone running an application designed to perform the features of the method 400. For example, the full-feature device 100 displays a rich user interface to enable a user to select/enter the AP SSID for use by the limited UI device 200, and to specify a security key. The application may also automatically verify the setup information by connecting to the specified AP in response to receiving the SSID and encryption key.

In one embodiment, the full-feature device 100 is already connected to the AP (e.g., prior to performing the method 400) for which the full-feature device 100 provides setup information to the limited UI device 200. For example, a home will often have only one AP, and the AP will be used by the full-feature device 100 for its Internet communication. In such an embodiment, although the full-feature device 100 will already be connected to the desired AP, for security reasons, an application running on the full-feature device 100 cannot access the security key used by the full-feature device 100 to generally connect to the AP. The user enters the security key into the application and the application can store the security key for future use. Alternatively, the application is granted access (e.g., through a default or user selected permission setting) to the security key. In one embodiment, the application determines the AP to which the full-feature device 100 is connected and the list of available AP's presented by the application to the user highlights or otherwise indicates the AP to which the full-feature device 100 is currently connected.

At block 415, once the full-feature device 100 (or application running on the full-feature device 100) has all of the setup information required to connect to the AP, the full-feature device 100 receives input to connect to the limited UI device 200 or otherwise determines how to connect to the limited UI device 200. As described above, input to connect to the limited UI device 200 includes one or both of the limited UI device's SSID and encryption key. In one embodiment, the full-feature device 100 will scan a barcode or QR code on the limited UI device 200 (e.g., using a smartphone camera or other scanning device) or otherwise read an RFID or NFC tag on or inside the limited UI device 200 using NFC to obtain the SSID and/or encryption key the full-feature device 100 uses to connect to the limited UI device 100. Alternatively, the user enters the limited UI device 200 SSID and/or encryption key manually through a keyboard, touchscreen, voice, or other input device 125. For example, this information may be included in the user manual for the limited UI device 200, on the limited UI device 200, on the limited UI device's packaging, on a web site, etc. In one embodiment, the input to connect to the limited UI device 200 scanned from a barcode (e.g., read from an RFID tag, entered by the user, etc.) is used to determine the SSID and security key of the limited UI device (e.g., the SSID and/or security key is extracted from a larger set of data or generated using an algorithm from the data). As described above, the full-feature device 100 uses the encryption key in the authentication process of creating a secure connection with the limited UI device 200. In an alternate embodiment, the full-feature device 100 connects to the limited UI device 200 without a security key.

At block 420, the full-feature device 100 connects to the limited UI device 200 using the SSID and security key (when applicable). In one embodiment, the full-feature device 100 automatically connects to the limited UI device 200 in response to the scanning of a barcode or QR code on the limited UI device 200 or reading of an RFID or NFC tag on or inside the limited UI device 200 described above.

Once connected, the full-feature device 100 sends the limited UI device 200 the setup information received at block 415. In one embodiment, the full-feature device 100 waits for a defined period of time and attempts to connect to the limited UI device 200 again to determine if the limited UI device 200 was able to connect to the AP using the setup information. If the full-feature device 100 succeeds in reconnecting to the limited UI device 200, the full-feature device 100 determines the limited UI device 200 was unable to connect to the specified AP and the method 400 is repeated.

In an embodiment in which there are multiple limited UI devices 200 with different SSIDs and/or security keys, the full-feature device may perform the entire method 400 once for the first limited UI device 200, and then proceed directly to blocks 415 and 420 for subsequent limited UI devices 200 (e.g., upon receiving input indicating that subsequent limited UI devices 200 are to receive the same network setup information as the first limited UI device 200). For example, the full-feature device 100 may scan each of the subsequent devices' barcode/QR codes or RFID/NFC tags and, in response, send each device the same setup information. In one embodiment, the full-feature device 100 also sends one or more limited UI devices 200 geoposition obtained from the GPS receiver in the full-feature device 100 or other data (e.g., as described above with reference to the method 300).

In one embodiment in which multiple limited UI devices 200 are to connect to the same AP, a two stage setup is used. Each limited UI device 200 starts with its own/unique SSID and security key for the full-feature device 100 to use to connect to the respective limited UI device 200. Once setup, the limited UI devices 200 are programmed with a shared SSID and security key to simplify future setup. The programming of the shared SSID and security key is done, e.g., as part of the setup process or after the limited UI devices 200 are connected to the AP/network. In one embodiment, this shared information is kept secure according to one of many well-known solutions to do so.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be appreciated that additional components, not shown, may also be part of the devices 100 and 200, and, in certain embodiments, fewer components than that shown in FIGS. 1 and 2 may also be used in the devices 100 and 200. It will be apparent from this description that aspects of the inventions may be embodied, at least in part, in software. That is, the computer-implemented methods 300 and 400 may be carried out in a computer system or other data processing system 100/200 in response to its processor or processing system 105/205 executing sequences of instructions contained in a memory 110/120/210/220 or in another non-transitory machine-readable storage medium. The software may further be transmitted or received over a network (not shown) via a network interface 130/230. In various embodiments, hard-wired circuitry may be used in combination with the software instructions to implement the present embodiments. Thus, the techniques are not limited to any specific combination of hardware circuitry and software, or to any particular source for the instructions executed by the data processing system 100/200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods. Although this description is focused upon an embodiment utilizing Wi-Fi, other networks may be able to use this invention to simplify or unify their setup.

What is claimed is:

1. A limited user interface (UI) device, comprising:
a network interface; and
a processing device coupled to the network interface and storing instructions that, when executed, cause the limited UI device to:
enter a network setup mode to enable a secure wireless connection with a full-feature device;
establish the secure wireless connection with the full-feature device, wherein establishing the secure wireless connection includes the full-feature device using an encryption key to establish the secure wireless connection and communicate with the limited UI device, the encryption key is scanned or read by the full-feature device from the limited UI device, and the limited UI device uses the encryption key to authenticate the full-feature device;
receive, from the full-feature device via the secure wireless connection, network setup information to enable the limited UI device to establish a wireless connection to a network access point, wherein the network setup information includes an identifier for the network access point and a security key for the network access point; and
establish the wireless connection to the network access point using the received network setup information.

2. The limited user interface (UI) device of claim 1, wherein the limited UI device lacks one or both of an input interface and a display interface.

3. The limited user interface (UI) device of claim 1, wherein entering the network setup mode includes the limited UI device broadcasting a network identifier for the limited UI device.

4. The limited user interface (UI) device of claim 1, wherein the limited UI device enters the network setup mode in response to a power up of the limited UI device, determining that the limited UI device is not connected to a network, or a near field communication with the full-feature device.

5. The limited user interface (UI) device of claim 1, wherein the network setup information includes a network address for the full-feature device, the full-feature device established a wireless connection to the network access point, and the instructions further cause the limited UI device to:

transmit an indication of successfully establishing the wireless connection to the network access point to the full-feature device over a network connection provided by the network access point and using the received network address for the full-feature device.

6. A computer-implemented method, comprising:

entering a network setup mode within a limited user interface (UI) device to enable a secure wireless connection with a full-feature device;

establishing the secure wireless connection with the full-feature device, wherein establishing the secure wireless connection includes the full-feature device using an encryption key to establish the secure wireless connection and communicate with the limited UI device, the encryption key is scanned or read by the full-feature device from the limited UI device, and the limited UI device uses the encryption key to authenticate the full-feature device;

receiving, from the full-feature device via the secure wireless connection, network setup information to enable the limited UI device to establish a wireless connection to a network access point, wherein the network setup information includes an identifier for the network access point and a security key for the network access point; and establishing, by the limited UI device, the wireless connection to the network access point using the received network setup information.

7. The computer-implemented method of claim 6, wherein the limited UI device lacks one or both of an input interface and a display interface.

8. The computer-implemented method of claim 6, wherein entering the network setup mode includes the limited UI device broadcasting a network identifier for the limited UI device.

9. The computer-implemented method of claim 6, wherein the limited UI device enters the network setup mode in response to a power up of the limited UI device, determining that the limited UI device is not connected to a network, or a near field communication with the full-feature device.

10. The computer-implemented method of claim 6, wherein the network setup information includes a network address for the full-feature device and the full-feature device established a wireless connection to the network access point, the method further comprising:

transmitting, by the limited UI device, an indication of successfully establishing the wireless connection to the network access point to the full-feature device over a network connection provided by the network access point and using the received network address for the full-feature device.

11. A non-transitory computer-readable medium storing instructions, which when executed by a processing device, cause the processing device to perform a method comprising:

receiving, by a full-feature device, user input including network setup information to establish a wireless connection with a network access point, wherein the network setup information includes an identifier for the network access point and a security key for the network access point;

receiving, by the full-feature device, input to establish a first secure wireless connection with a first limited user interface (UI) device;

establishing, by the full-feature device, the first secure wireless connection with the first limited UI device in response to the received user input to establish the connection, wherein establishing the first secure wireless connection includes the full-feature device using a first encryption key to establish the secure wireless connection and communicate with the first limited UI device, the encryption key is scanned or read by the full-feature device from the limited UI device, and the limited UI device uses the first encryption key to authenticate the full-feature device; and transmitting, by the full-feature device to the first limited UI device via the secure wireless connection, the received network setup information to enable the first limited UI device to establish the wireless connection with the network access point.

12. The non-transitory computer-readable medium of claim 11, the method further comprising:

establishing, by the full-feature device, a wireless connection with the network access point using the received network setup information prior to transmitting the network setup information to the first limited UI device to verify that the received network setup information is correct.

13. The non-transitory computer-readable medium of claim 11, wherein the full-feature device scans a barcode or quick response (QR) code on the first limited UI device to obtain the access point identifier for the first limited UI device or the first encryption key.

14. The non-transitory computer-readable medium of claim 11, wherein the full-feature device reads a radio frequency identification (RFID) tag or near field communication (NFC) tag within the first limited UI device to obtain the access point identifier for the first limited UI device or the first encryption key.

15. The non-transitory computer-readable medium of claim 11, the method further comprising:

receiving, by the full-feature device, input to establish a second secure wireless connection with a second limited user interface (UI) device;

establishing, by the full-feature device, the second secure wireless connection with the second limited UI device in response to the received user input to establish the second secure wireless connection, wherein establishing the second secure wireless connection includes the full-feature device using a second encryption key to communicate with the second limited UI device and the second limited UI device using the second encryption key to authenticate the full-feature device; and transmitting, by the full-feature device to the second limited UI device, the received network setup information to enable the second limited UI device to establish a wireless connection with the network access point.

16. The non-transitory computer-readable medium of claim 15, the method further comprising:
  transmitting, by the full-feature device to each of the first limited UI device and the second limited UI device, a shared network identifier and shared encryption key to enable the full-feature device to establish secure wireless connections with each of the first limited UI device and the second limited UI device using the shared network identifier and shared encryption key.

* * * * *